(No Model.)
M. BOURKE.
COMBINATION TOOL.
No. 331,371. Patented Dec. 1, 1885.
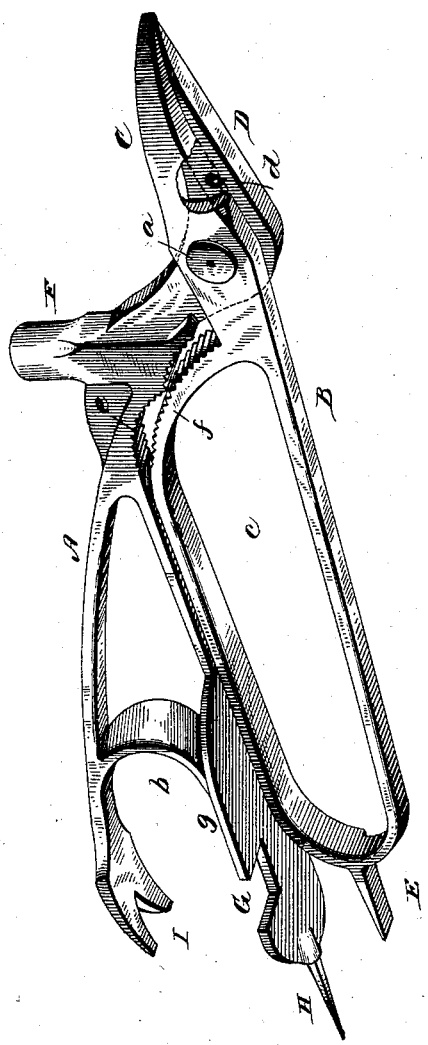
Witnesses
Wm. T. Sheidell
Chas. H. Davis
Inventor
Martin Bourke,
By his Attorney Chas. H. Fowler

UNITED STATES PATENT OFFICE.

MARTIN BOURKE, OF YOUNGSTOWN, OHIO.

COMBINATION-TOOL.

SPECIFICATION forming part of Letters Patent No. 331,371, dated December 1, 1885.

Application filed June 25, 1885. Serial No. 169,777. (No model.)

*To all whom it may concern:*

Be it known that I, MARTIN BOURKE, a citizen of the United States, residing at Youngstown, in the county of Mahoning and State of Ohio, have invented certain new and useful Improvements in Combination-Tools; and I do hereby declare that the following is a full, clear, and exact description of the same, reference being had to the annexed drawing, making part of this specification, and to the letters and figures of reference marked thereon.

The present invention has for its object to provide a combination-tool having several of its implements conveniently arranged with relation to each other, so that each can be used with effect for the purpose intended; and the invention consists in the tool constructed substantially as shown in the drawing, and hereinafter described and claimed.

In the accompanying drawing, A B represent the two levers, pivoted together at *a*, the forward ends of the levers beyond their pivotal connection terminating in cutting-blades C D, the same being operated as in the ordinary shears, the levers A B having respectively the loops *b c* for the thumb and fingers. The blades C D may be used as a can-opener or for cutting sheet metal generally, as used by the tinner's shears.

In order to enable the shears to cut wire, I provide one of the blades with a hole, *d*, extending through it, through which the wire is passed, thus holding it while the other blade is brought down on the wire to cut it, this being done without danger of the wire slipping. The lever B, which consists of the two bars forming the loop *c*, is provided at its rear end with a screw-driver, E. The inner sides of the levers A B, immediately in the rear of their pivotal connection, have respectively serrations *e f*, to serve as a pipe-wrench and a nut-cracker when the object is placed between the serrated portions of the levers and the latter brought together. The lever A is provided with a hammer, F, and at the rear of the lever is a thumb-supporting plate, *g*, when the two levers are grasped by the fingers. This plate *g* has a wrench, G, and a suitable awl, H, also a claw, I, which serves the purpose of a tack or nail drawer, also a stove-lid lifter. The shank of the claw I, also the plate *g*, forms, respectively, the outer and inner portions of the loop *b*.

The implements or tools, as above described, are arranged in convenient position for ready use when found necessary, and the combination-tool may be placed upon the market at a comparatively small cost.

Having now fully described my invention, what I claim as new, and desire to secure by Letters Patent, is—

A combination-tool consisting of two pivoted levers terminating at one end in cutting-blades, one of which has a perforation through it to receive the end of wire while being cut, said levers having loops for the fingers, and formed with serrations immediately in the rear of its pivotal connection, to serve as a pipe-wrench and nut-cracker, substantially as and for the purpose set forth.

In testimony that I claim the above I have hereunto subscribed my name in the presence of two witnesses.

MARTIN BOURKE.

Witnesses:
 CHAS. D. DAVIS,
 M. P. CALLAN.